United States Patent
Konishi et al.

(10) Patent No.: US 8,886,433 B2
(45) Date of Patent: Nov. 11, 2014

(54) ELECTRIC BRAKING CONTROL APPARATUS AND ELECTRIC BRAKING APPARATUS

(75) Inventors: Yasufumi Konishi, Hitachinaka (JP); Toshiyuki Innami, Mito (JP); Satoru Kuragaki, Isehara (JP); Takafumi Suzuki, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 1787 days.

(21) Appl. No.: 11/876,411

(22) Filed: Oct. 22, 2007

(65) Prior Publication Data
US 2008/0097675 A1 Apr. 24, 2008

(30) Foreign Application Priority Data
Oct. 23, 2006 (JP) .................................. 2006-287086

(51) Int. Cl.
*B60T 13/74* (2006.01)
*B60T 8/00* (2006.01)
*B60T 8/88* (2006.01)

(52) U.S. Cl.
CPC ........... *B60T 8/885* (2013.01); *B60T 2270/414* (2013.01); *B60T 13/741* (2013.01)
USPC ................... 701/78; 701/70; 701/75; 701/79; 318/362; 318/400.09; 318/400.2; 318/400.26; 318/400.3; 318/757; 318/759

(58) Field of Classification Search
USPC ........ 701/1, 70, 75, 78, 79; 318/51, 362, 364, 318/368, 369, 400.17, 400.2, 400.26, 703, 318/757–768, 809, 372, 375, 376, 400.01, 318/400.09, 400.3, 400.42, 434, 599, 689
See application file for complete search history.

(56) References Cited

U.S. PATENT DOCUMENTS

| | | | | |
|---|---|---|---|---|
| 5,988,307 A * | 11/1999 | Yamada et al. | ............... | 180/243 |
| 6,810,316 B2 | 10/2004 | Yokoyama et al. | | |
| 6,917,179 B2 * | 7/2005 | Komatsu et al. | ............... | 318/700 |
| 7,516,823 B2 * | 4/2009 | Kikuchi et al. | ............... | 188/158 |
| 7,644,998 B2 * | 1/2010 | Nishino et al. | ................ | 303/140 |
| 2003/0066719 A1 * | 4/2003 | Watanabe et al. | ............ | 188/72.7 |

(Continued)

FOREIGN PATENT DOCUMENTS

| | | |
|---|---|---|
| EP | 1 686 029 A1 | 8/2006 |
| EP | 1 690 768 A1 | 8/2006 |
| JP | 2006-232259 A | 9/2006 |

OTHER PUBLICATIONS

European Search Report dated Feb. 8, 2008 (Six (6) pages).

(Continued)

*Primary Examiner* — Jack W Keith
*Assistant Examiner* — Chuong P Nguyen
(74) *Attorney, Agent, or Firm* — Crowell & Moring LLP

(57) ABSTRACT

An electric braking control apparatus for controlling an electric braking apparatus which includes a brake pad, a motor which generates a rotational torque, and a rotation/linear motion conversion mechanism which causes the brake pad to generate a pressing force based on the torque. The braking control apparatus includes an inverter which converts and outputs an electric current supplied from a power supply to the motor, and a microcomputer that receives power from the power supply, detects the value of a voltage applied from the power supply to the inverter, and controls the electric current output from the inverter depending on a result of the detection.

7 Claims, 14 Drawing Sheets

(56) References Cited

U.S. PATENT DOCUMENTS

| | | |
|---|---|---|
| 2004/0026989 A1 | 2/2004 | Suzuki et al. |
| 2004/0056616 A1* | 3/2004 | Honda .......................... 318/434 |
| 2004/0231897 A1* | 11/2004 | Kimura et al. ............... 180/65.2 |
| 2005/0189890 A1* | 9/2005 | Kuramochi et al. .......... 318/139 |
| 2006/0007615 A1* | 1/2006 | Ochiai et al. ................... 361/71 |
| 2006/0052915 A1* | 3/2006 | Sato ................................ 701/22 |
| 2006/0061307 A1* | 3/2006 | Donnelly ....................... 318/108 |
| 2006/0163939 A1 | 7/2006 | Kuramochi et al. |
| 2006/0197374 A1* | 9/2006 | Jez ................................. 303/20 |
| 2007/0035178 A1* | 2/2007 | Suzuki .................... 303/122.05 |
| 2007/0138986 A1* | 6/2007 | Kutsuna et al. ............... 318/254 |
| 2008/0048596 A1* | 2/2008 | Konishi et al. ................ 318/372 |
| 2008/0054718 A1* | 3/2008 | Nishino et al. ................ 303/146 |
| 2008/0091326 A1* | 4/2008 | Watanabe et al. ............... 701/70 |
| 2008/0106142 A1* | 5/2008 | Nishino et al. .................. 303/10 |

OTHER PUBLICATIONS

Japanese Office Action including partial English translation dated Jul. 13, 2010 (Three (3) pages).

U.S. Appl. No. 11/835,770, filed Aug. 8, 2007.

* cited by examiner

ELECTRIC BRAKING CONTROL APPARATUS AND ELECTRIC BRAKING APPARATUS

CROSS-REFERENCE TO RELATED APPLICATION

The present application relates to subject matters described in a co-pending patent application Ser. No. 11/835,770 filed on Aug. 8, 2007 entitled "ELECTRIC BRAKING APPARATUS AND METHOD OF CONTROLLING THEREOF" by Yasufumi Konishi, et al. and assigned to the assignees of the present application. The disclosures of this co-pending application are incorporated herein by reference.

BACKGROUND OF THE INVENTION

The present invention relates to electric braking apparatus for use in a vehicle in which the brake friction member is pressed by a drive force of an electric motor against a brake rotor coupled to each of the wheels, thereby generating a braking force against that wheel.

The electric braking apparatus includes a mechanical section disposed on each wheel side of the vehicle to cause the electrical motor to generate the braking force, and an electrical circuit section that controls the braking force generated by the motor.

U.S. Pat. No. 6,810,316 issued on Oct. 26, 2004 discloses an electric braking apparatus that supplies power to an electric circuit via a power supply line composed of a cable which connects the chassis side and the wheel side of a vehicle.

SUMMARY OF THE INVENTION

When a voltage applied to the electric braking apparatus drops below a predetermined voltage, there is a possibility that the components of the electric circuit (hereinafter referred to as an electric brake control unit) will be shut down completely. Thus, there also is a possibility that the electric brake control unit will not operate the electric braking apparatus in a stabilized manner, which reduces the reliability of the braking force control.

It is therefore an object of the present invention to provide an electric braking apparatus in which the reliability of the braking force control is ensured even when the battery voltage or power supply line voltage drops.

In view of the above problems, the inventive electric braking apparatus limits a current which flows through the power supply line connected to the electric brake control unit such that the voltage applied to the components of the electric brake control unit does not drop below a predetermined voltage.

According to the inventive electric braking apparatus, the reliability of the braking force control is ensured even when the battery voltage or the power supply line voltage drops.

Other objects, features and advantages of the invention will become apparent from the following description of the embodiments of the invention taken in conjunction with the accompanying drawings.

DESCRIPTION OF THE EMBODIMENTS

Embodiment of the electric braking control apparatus and electric braking apparatus according to the present invention will be described with reference to the accompanying drawings.

Embodiment 1

We will describe control of the electric braking control apparatus to be provided when the voltage applied by the power supply is below a predetermined voltage, which involves the embodiment 1 of the present invention.

Figure 1:
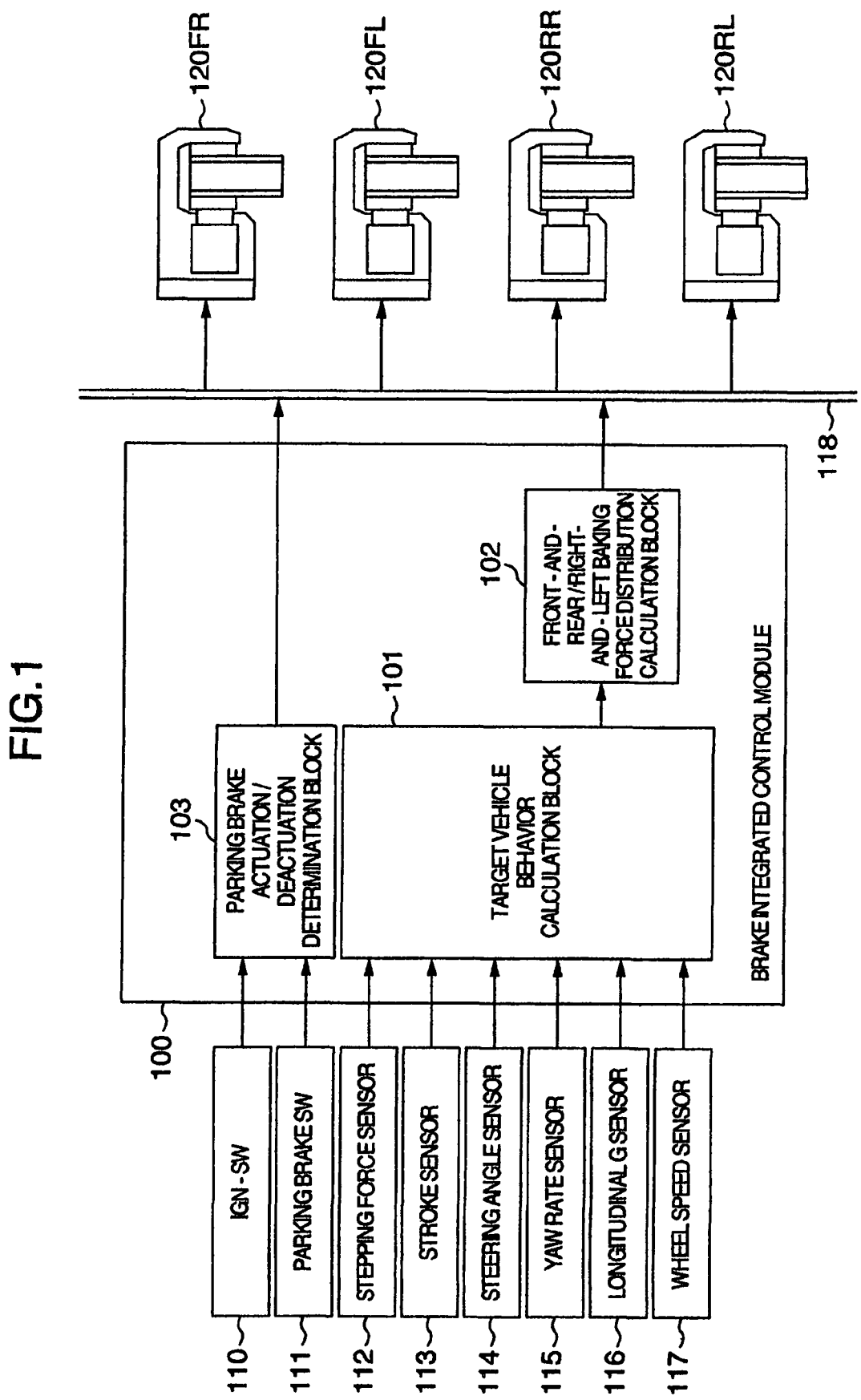
FIG. 1 illustrates a schematic composition of an embodiment of an electric braking system according to the present invention

FIG. 1 illustrates one embodiment of the composition of an electric braking system according to the present invention. The system includes a brake integrated control module 100 and four electric braking apparatus 120FR, 120FL, 120RR and 120RL for the respective wheels.

The controller 100 senses driver's operation quantities from a brake pedal stepping force sensor 112 and a brake pedal stroke sensor 113 both provided on a brake pedal (not shown), and a steering angle sensor 114 provided on a steering wheel (not shown). Further, the controller 100 senses a vehicle behavior, using a longitudinal G (gravity) sensor 116 and a yaw rate sensor 115 both provided on a chassis, and four wheel speed sensors 117 each provided on a respective one of the wheels.

A target vehicle-behavior calculation block 101 calculates a target deceleration and a target yaw rate both based on the driver's operation quantities and an actual vehicle behavior. A front-and-rear/right-and-left braking pressure distribution calculation block 102 calculates pressures applied to the respective wheels based on the target deceleration and target yaw rate, and sends corresponding pressure commands to the respective electric braking apparatus 120FR, 120FL, 120RR and 120RL for the wheels via a multiple communication path 118.

The electric braking apparatus 120FR, 120FL, 120RR and 120RL receive the pressure commands from the brake integrated control module 100 via the multiple communication path 118, controls an electric current quantity to be supplied to a motor 206, which will be described in greater detail later, thereby providing pressure control based on the commands.

A parking brake activation/deactivation determination block 103 detects a driver's operation of a parking brake SW 111, generates a parking brake activation or deactivation command in accordance with a result of the detection and sends the command to the respective electric braking apparatus 120 FR, 120 FL, 120 RR and 120 RL via the multiple communication path 118.

When the electric braking system is shut off, for example, thereby turning off an IGN-SW 110, the parking brake activation/deactivation determination block 103 gives a parking brake activation command to each of the electric braking apparatus 120 (120 FR, 120 FL, 120 RR and 120 RL) via the multiple communication path 118, thereby ensuring that the parking brakes apply braking forces to the braking apparatus when the electric braking system is shut off.

Figure 2:
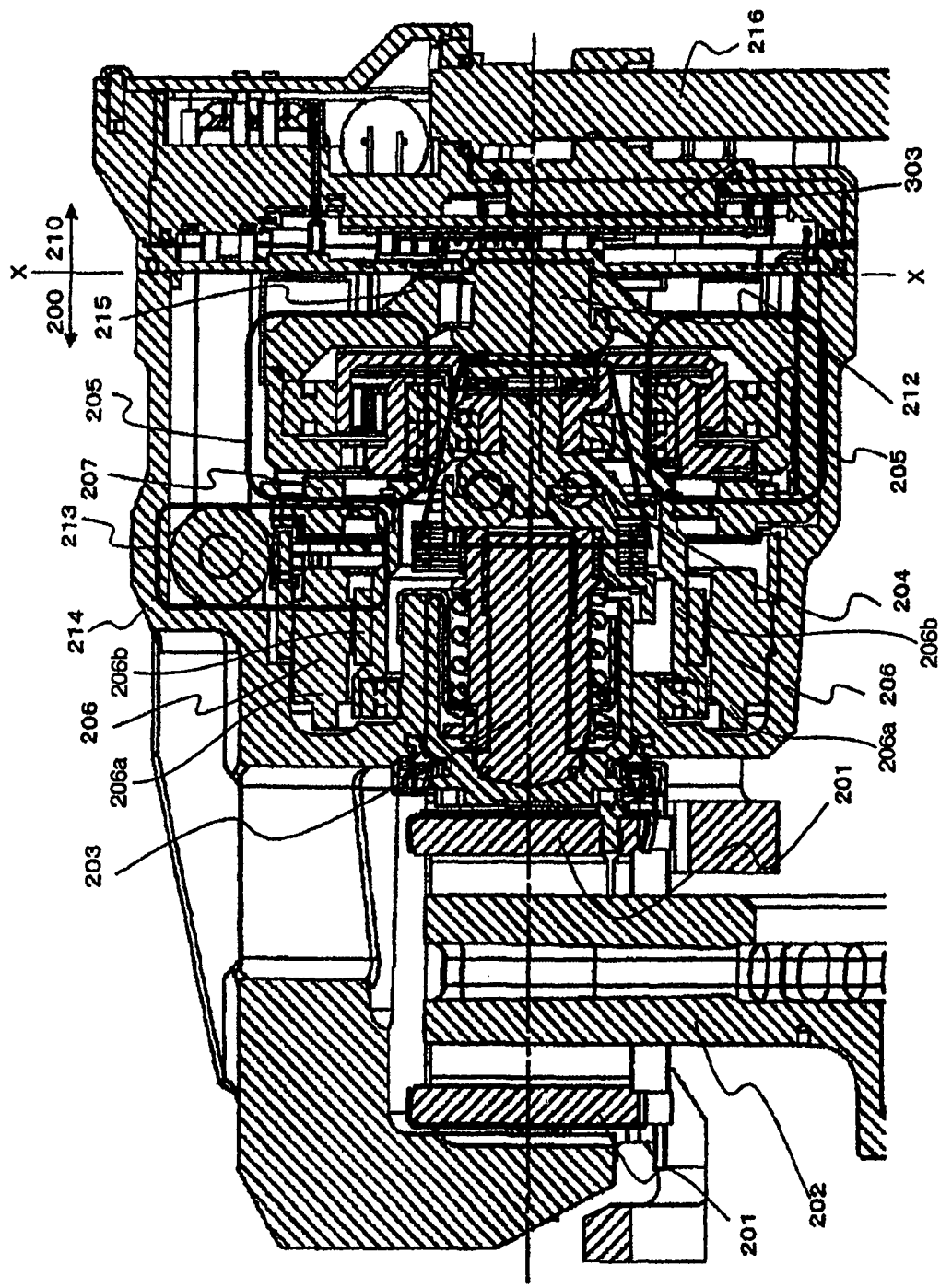
FIG. 2 is a cross section view of an embodiment of the electric braking apparatus.

FIG. 2 shows an embodiment of each of the electric braking apparatus 120 (FR, FL, RR, RL) according to the present invention.

In the electric braking apparatus, reduction gears 205 reduce a rotational speed of the motor 206 with a motor rotational position sensor 207; a rotation/linear motion conversion mechanism 204 converts the rotational motion of the motor 206 to a linear motion; and a linear motion piston 203 presses a brake pad 201 against a brake rotor 202, thereby generating a braking force.

Control of the braking force in the electric braking apparatus is established by feeding back an output from a pressure sensor 212 to the brake integrated control module 100 and controlling the motor 206 such that the motor follows up a pressing force command given by the brake integrated control module 100.

In this embodiment, an electric brake control unit 210 which includes a microcomputer 302, an inverter 303, the sensor input circuits, etc., for controlling the motor 206 is built mechanically as a unit in the electric braking apparatus 120.

In FIG. 2, a brake mechanism section 200 and the electric brake control unit 210 of the electric braking apparatus 120 are shown on the left and right sides, respectively, of a vertical line X-X.

In FIG. 2, the parking brake mechanism, the reduction gears and the rotation/linear motion conversion mechanism are shown in thick-line frames 213, 205 and 204, respectively.

The electric motor 206 is composed, for example, of a brushless three-phase motor that includes a stator 206a fixed to a housing 214 containing a carrier and a rotor 206b disposed within the stator 206a. The motor 206 is driven such that the rotor is rotated through a predetermined angle at a predetermined torque in accordance with a command from a microcomputer 302, which will be described in greater detail later. A rotor position angle is sensed by a rotor position angle sensor 207. Batteries 305 (FIG. 3) mounted on the vehicle supplies power to the motor 206 via a harness 216 and an inverter 303, which will be described later in greater detail.

The harness 216 includes a high power supply line 307 and a multiple communication path 118 to be described in greater detail later.

The reduction gears 205 reduce the rotational speed of the motor 206, thereby increasing its torque. Thus, the motor 206 may be of a small size.

The brake mechanism 200 includes a thrust plate 215 disposed on the side of the electric brake control unit 210. The thrust plate 215 has a pressing force sensor 212 provided at the center thereof so as to receive a thrust of a piston 203 as a reaction force.

The thrust plate 215 is at a position deviating somewhat toward a pad section (including the brake pad 201 and its peripheral components) from an end of the housing 214 of the brake mechanism 200 (shown by the line X-X in FIG. 2) to which the electric brake control unit 210 is attached. The pressing force sensor 212 protrudes somewhat toward the electric brake control unit 210 beyond the end of the housing 214. A component of the braking control unit 210 has a cavity to avoid interference with the pressing force sensor 212. This creates a gap or space between the components of the electric brake control unit 210 and brake mechanism 200 excluding the housing 214.

Most of the components of the brake mechanism 200 are made of metal along with the housing 214 which is in contact with the stator of the motor 206. Thus, the heat conductivity efficiency is high. Therefore, heat emitted by the pad section as a hear source is transmitted to the brake mechanism 200 in the vicinity of the heat source and hence easy to emit through the housing 214 outside the brake mechanism 200. Such heat measures serve to restrict a copper loss caused in the motor coil owing to a flow of high current through the motor and reduce a voltage drop across the motor coil.

The electric brake control unit 210 is provided, for example, on the opposite side of the brake mechanism 200 from the pad section. Thus, an amount of heat which will be transmitted to the electric brake control unit 210 is extremely reduced. A power module (hereinafter referred to as an inverter) 303 which includes an inverter element to control the driving of the motor 206 is disposed in contact with the metal housing of the electric brake control unit 210 on the opposite side of the motor 206 from the brake pad 201. Thus, transmission of heat to the inverter 303 is restricted and efficient hear radiation is achieved.

The above-mentioned gap (or space) formed between the brake mechanism 200 and the electric brake control unit 210 serves to further reduce transmission of heat from the brake mechanism 200 to the braking control unit 210.

Figure 4:
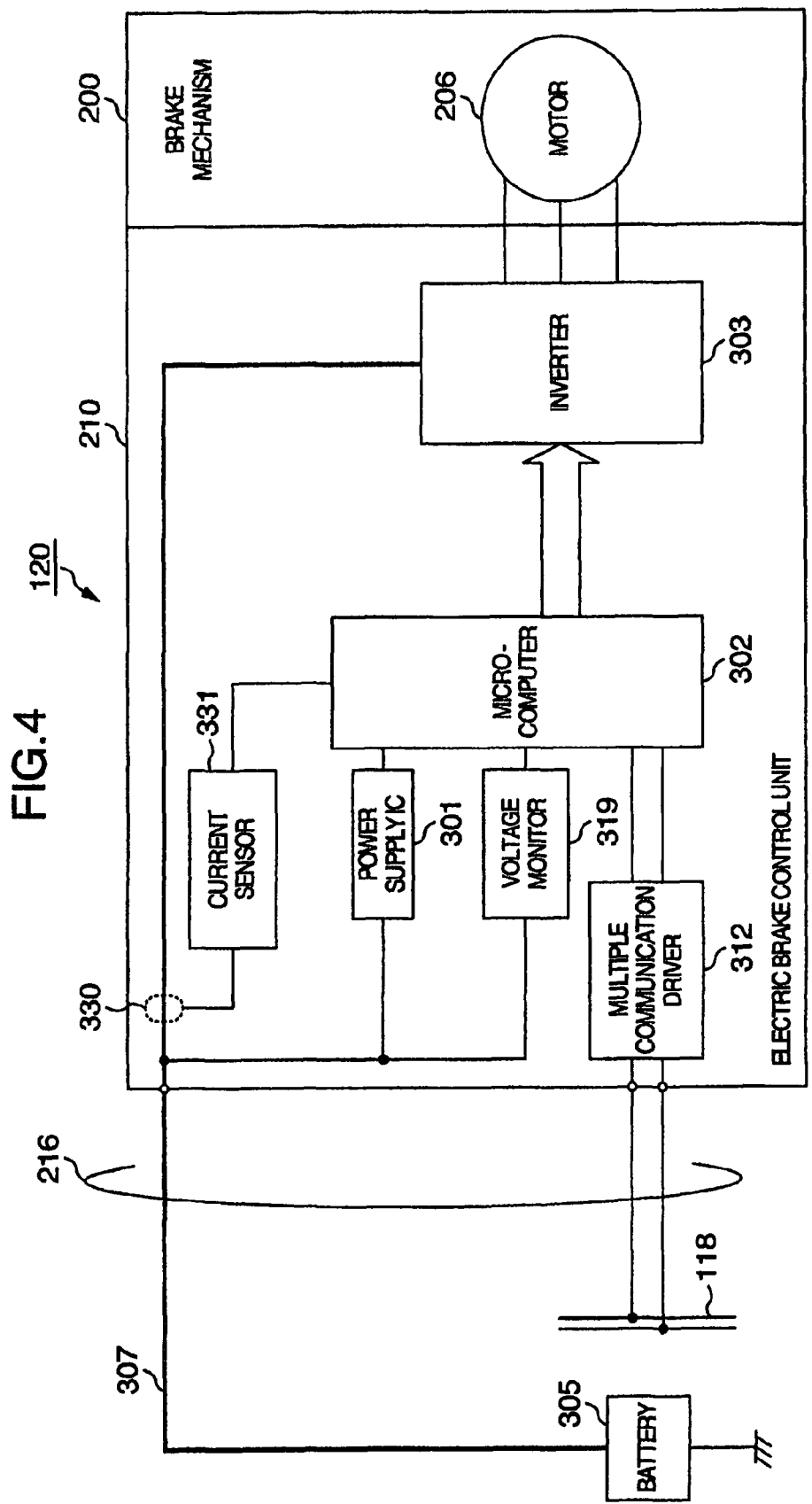
FIG. 4 illustrates another embodiment of the power supply circuit composition of the electric brake control unit 210.

One embodiment of the electric brake control unit 210 is shown in FIG. 4.

The microcomputer 302 receives control signals from the brake integrated control module 100 via the multiple communication path 118 and a multiple communication driver 312. A voltage monitor 319 monitors a voltage applied to an inverter 303 and to a power supply IC (integrated circuit) 301 and outputs the monitored voltage to the microcomputer 302. A current detector 331 detects, at a current detection point 330, a current supplied to the electric brake control unit 210 via a high power supply line 307, and outputs a result of the detection to the microcomputer 302. The power supply IC 301 is a circuit which supplies stabilized power to the microcomputer 302. More particularly, the power supply IC 301 adjusts a voltage from the power supply mounted on the vehicle so as to be an output voltage required to drive the microcomputer 302 and then applies the output resulting voltage to the microcomputer.

Generally, when an electric braking apparatus including an electric motor is desired to generate a braking force instantaneously in a state where the apparatus is deactivated, or otherwise desired to be deactivated in a state where the apparatus is generating the braking force, the motor requires high torque and high rotational speed, which causes high current to flow through the motor and hence increases a copper loss occurring across the motor coil. As a result, high power is required, which causes a high rush current to flow through the power supply line for the electric braking apparatus and a relatively large voltage drop across the power supply line owing to its line resistance.

Especially, if high power is tried to be supplied to the motor when the power supply voltage, for example from the batteries, is low, a much higher rush current would flow through the power supply line. Thus, a rate of the voltage drop across the power supply line to the power supply voltage would increase. As a result, the voltage applied substantially to the electric braking apparatus would drop greatly.

With the electric circuit composition of FIG. 4, the high power supply line 307 which supplies power to the inverter 303 also supplies power to the power supply IC 301, which in turn supplies power to the microcomputer 302 which is an arithmetic device for the motor control. When the high rush current flows through the high power supply line 307, a voltage drop occurs across the power supply line 307 owing to its harness resistance (wire resistance), which also causes voltage drops across the electric brake control unit 210, the inverter 303 and the power supply IC 301.

In the embodiment of FIG. 4, the power supply IC 301 has the highest value of minimum operation voltage, and first becomes inoperable owing to a voltage drop across the high power supply lines 307, among the elements of the electric brake control unit 210 to which the high power supply line 307 supplies power.

If, for example, a 30 A rush current flows through the high power supply line 307 which extends from the battery 305 to the electric brake control unit 210 and the resistance of the line is 50 mΩ, a voltage drop of 1.5 V occurs across the power supply line 307. At this time, the voltage across the electric brake control unit 210 is 5.5 V if the battery 305 voltage is 7V. If the lowest operation voltage of the power supply IC 301 is 6 V, power supply to the microcomputer 302 becomes insufficient and the electric braking apparatus cannot operate in a stabilized manner owing to the voltage drop across the power supply IC 301 although the voltage across the battery 305 is 7 V.

Even when the battery voltage is normal, an excessively high rush current would increase the voltage drop across the high power supply line 307, which would supply an insufficient operating voltage to the power supply IC 301. Thus, the electric braking apparatus cannot operate in a stabilized manner.

In order to avoid such undesirable situation, the microcomputer 302 detects an inverter application voltage Vinv in a power supply monitor 319 connected to the high power line 307 and controls a current to be supplied to the inverter 303 such that the inverter application voltage Vinv does not decrease below the minimum operation voltage Vmin of the power supply IC 301.

For example, let Idc and Rdc be the current flowing through the high power supply line 307 and the harness resistance of the power supply line 307, respectively. Then, a voltage drop ΔV across the power supply line 307 is given by:

$$\Delta V = Rdc \times Idc \quad (1)$$

The voltage Vinv applied to the electric braking apparatus after ΔV voltage drop has occurred across the power supply line 307 is given by:

$$Vinv = Vbat - \Delta V \quad (2)$$

where Vbat is the battery voltage.

Let Vmin be the minimum operation voltage of a component (in this embodiment, the power supply IC 301) to which power is supplied from the high power supply line 307. Then, the following expression holds:

$$Idc \leq (Vbat - Vmin)/Rdc \quad (3)$$

When the current Idc is controlled such that the expression (3) holds, the following expression holds:

$$Vmin \leq Vinv \quad (4)$$

Thus, it is ensured that the braking apparatus can continue to operate in a stabilized manner in spite of the battery voltage such that the voltage Vinv applied to the electric braking apparatus does not decrease below the minimum operation voltage Vmin of the components.

Figure 5:
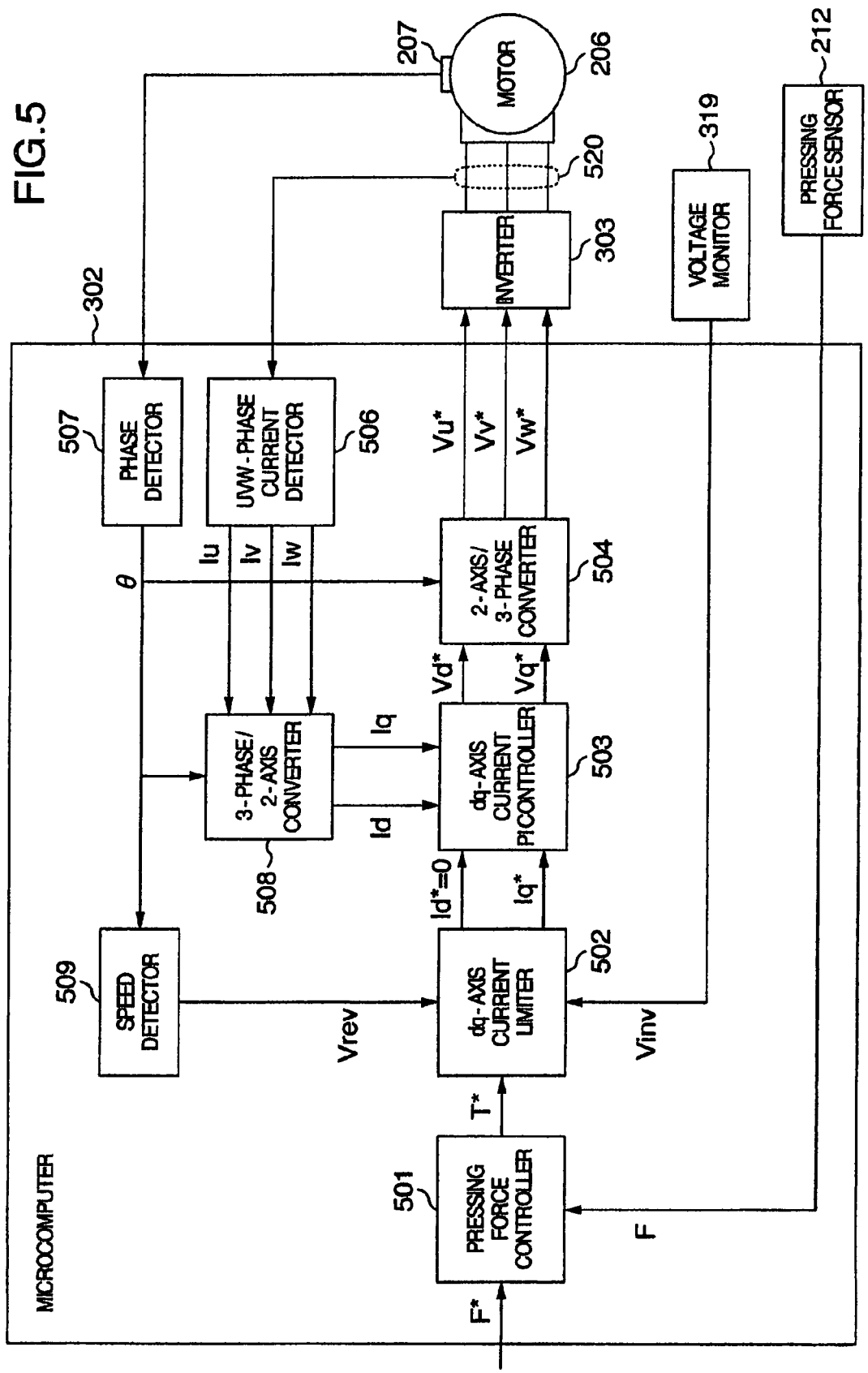
FIG. 5 is a block diagram of an inverter control process to be performed by a microcomputer 302.

FIG. 5 is a block diagram of an inverter control process to be performed by the microcomputer 302.

A pressing force controller 501 acquires a pressing force command value F* from the multiple communication path 118 and an actual pressing force F sensed by the pressing force sensor 212, and provides feedback control such that the actual pressing force F follows up the pressing force command value F*, thereby outputting a motor torque command value T*.

A dq-axis current limiter 502 outputs a torque component current command value Iq* and a field component current command value Id* based on a motor torque command value T*, a motor rotational speed Vrev, and an inverter application voltage Vinv. The detailed process to be performed by the dq-axis current limiter 502 will be described later. In this embodiment, the field component current command value Id* is set to zero A at all times on the assumption that no field weakening control is provided.

The motor rotational speed Vrev to be used in the dq-axis current limiter 502 is the one obtained by differentiating, in a speed detector 509, a phase θ detected by a phase detector 507.

A 3-phase/2-axis converter 508 acquires the phase Θ sensed by the phase sensor 507, and U-, V- and W-phase actual currents Iu, Iv and Iw sensed by a UVW-phase current sensor 506 from current information obtained at a phase current sensing point 520, and converts the U-, V- and W-actual currents Iu, Iv and Iw to actual torque and field component currents Iq and Id, using coordinate axis conversion.

A dq-axis current PI (proportional-integral) controller 503 provides PI control such that the fed-back real torque and field component current values Iq and Id follow the torque and field component current command values Iq* and Id*, thereby outputting torque and field component voltage command values Vq* and Vd*, respectively.

The 2-axis/3-phase converter 504 converts the torque and field component voltage command values Vq* and Vd* to U-, V- and W-phase voltage command values Vu*, Vv* and Vw* based on the phase Θ sensed by the phase sensor 507, using the coordinate axis conversion. Then, the inverter 303 outputs, to the motor 3-phase fields, voltages corresponding to the U-, V- and W-phase voltage command values Vu*, Vv* and Vw*, thereby driving the motor.

Figure 6:
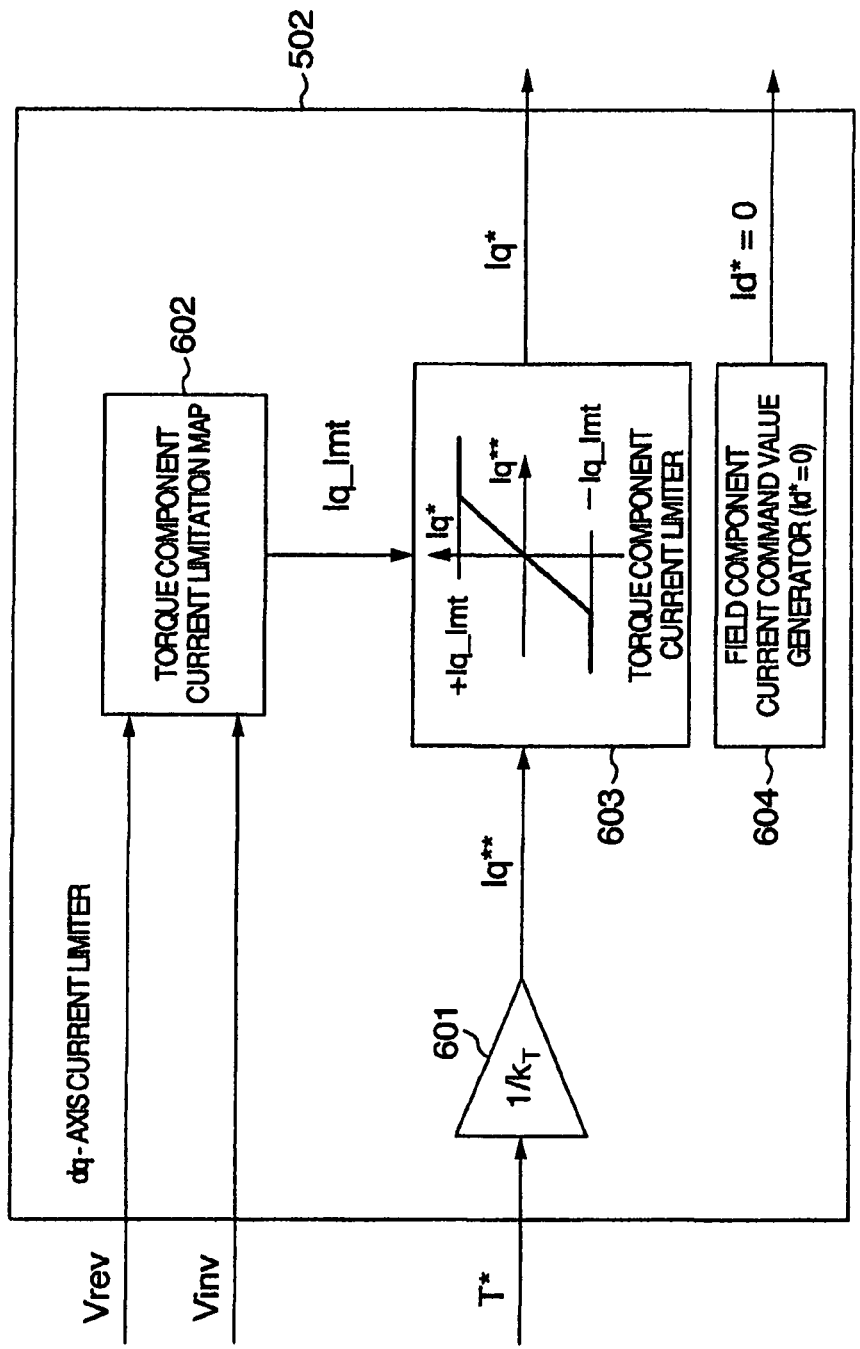
FIG. 6 illustrates one embodiment of a dq-axis current limiter 502 of FIG. 5.

FIG. 6 is a block diagram of the dq-axis current limiter 502 of FIG. 5.

A torque-current conversion block 601 divides a motor torque command value T* by a torque constant $k_T$ to provide an unlimited torque component current command value Iq**. Now, let Tm be the motor output torque. Then, a current Iq which satisfies a relationship Tm=$k_T$×Iq is defined as a torque component current. The torque constant $k_T$ to be used is stored beforehand in a non-volatile storage device (not shown).

In the torque component current limitation map 602, a torque component current limit value Iq_lmt is acquired based on a three-dimensional map (see FIG. 7) whose axes are represented by motor rotational speed Vrev and inverter application voltage Vinv, respectively. The torque component current limitation map 602 to be used is beforehand stored in a non-volatile storage device, and a torque component current limit value Iq_lmt between adjacent map lattices is calculated in accordance with linear interpolation scheme.

The torque component current limiter 603 limits an absolute value of the unlimited torque component current command value Iq** to the torque component current limit value Iq_lmt, thereby deriving a torque component current command value Iq*. As described above, it is assumed in the present embodiment that no field-weakening control should be provided, and the field component current command value Id* is set to Id*=0 (zero) in the field component current command value generator 604.

Figure 7:
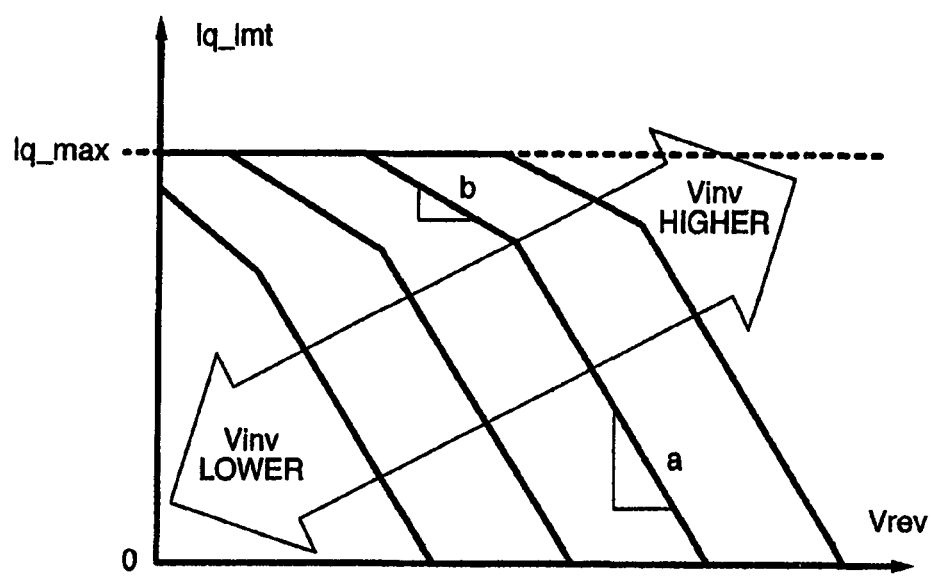
FIG. 7 illustrates one embodiment of a torque component current limitation map.

FIG. 7 illustrates one embodiment of the torque component current limitation map 602. Note that FIG. 7 expresses a three-dimensional map in two dimensions. The vertical axis indicates a torque component current limit value Iq_lmt while the horizontal axis indicates a rotational speed Vrev of the motor 206. An arrow 700 indicates that the voltage applied to the electric braking apparatus increases in the upper right direction in the graph.

A maximum torque component current value Iq_max in FIG. 7 can be derived from conditions for a maximum current to be allowed to flow through the motor 206 and the inverter 303. The maximum torque component current value Iq_max is determined by a current corresponding to a maximum torque of the motor 206 which is determined based on three groups of conditions; that is, conditions under which the coil of the motor 206 is not burnt out by heat produced even when high current flows through the coil, conditions under which the inverter 303 is not broken down owing to heat produced by the inverter 303 even when high current flows through the inverter 303, and system conditions involving whether the electric brakes are installed at the front or rear wheels.

A gradient "a" in FIG. 7 can be obtained from an induced voltage constant for the motor 206. Alternatively, the gradient "a" may be set so as to be sequentially changed based on temperature information from a temperature sensor (not shown) installed in the brake mechanism 200.

A gradient "b" in FIG. 7 can be obtained from a relationship among powers consumed by the battery 305, the high power supply line 307 and the electric brake control unit 210. The gradient value "b" can be actually obtained experimentarily using the electric brake control unit 210. For example, depending on the rotational state of the motor 206, the actual current flowing through the motor 206 can be greater than a current command value for the motor 206. Such conditions under which the motor 206 are in the rotational state are derived and under these conditions a current command value for the motor 206 is set to a low value, as shown by the gradient "b". Alternatively, the gradient "b" may be sequentially changed based on temperature information from the temperature sensor installed in the brake mechanism 200.

Figure 14:
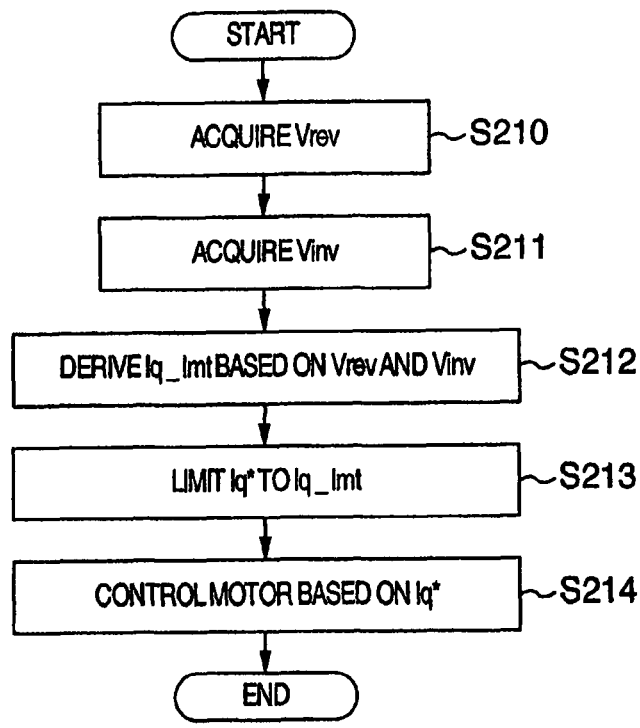
FIG. 14 is a flowchart of a current limiting process.

FIG. 14 show a flowchart of the current limiting process.

First, step S210 acquires a motor rotational speed Vrev. Then, step S211 acquires an inverter application voltage Vinv. Then, step S212 derives a torque component current limit value Iq_lmt from the torque component current limitation map 602 of FIG. 7. Then, step S213 limits the absolute value of the unlimited torque component current command value Iq** to the torque component current limit value Iq_lmt in the torque component current limiter 603 of FIG. 6, thereby providing a torque component current command value Iq*. Then, the motor 206 is controlled in accordance with the inverter control of FIG. 5 based on the derived torque component current command value Iq*. The FIG. 14 flowchart illustrates the process to be performed periodically and repeatedly.

Figure 8:
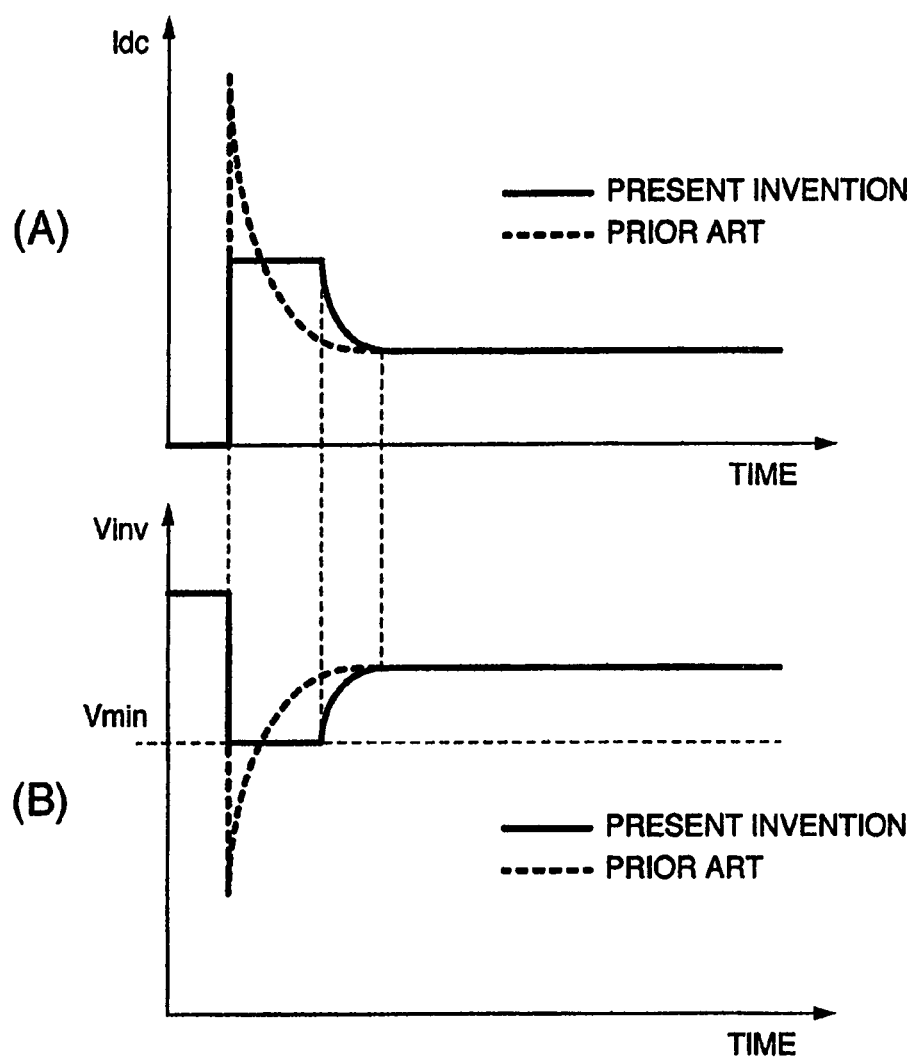
FIG. 8 is a diagram of comparison of current and voltage waveforms.

FIG. 8 illustrates one example of waveforms of currents Idc flowing through the high-power supply line 307 and waveforms of voltages Vinv applied to the electric braking apparatus when the motor is changed instantaneously from its stop state to its high speed rotation to change the braking force instantaneously. A solid line involves a technique for the present embodiment and a broken line a prior art technique. The vertical axis of FIG. 8A represents the value of a current flowing through the high-power supply line 307 and the horizontal axis represents time. The vertical axis of FIG. 8B represents the value of a voltage applied to the electric braking apparatus and the horizontal axis represents time.

As shown in FIG. 8, according to the embodiment, the voltage Vinv applied to the electric braking apparatus is maintained above a predetermined voltage Vmin by controlling a rush current flowing through the high power supply line 307 such that a voltage drop across the high-power supply line 307 is suppressed. Thus, the electric braking apparatus continues to operate in a stabilized manner regardless of voltage drop at the battery.

That is, the maximum current flowing through the motor 206 is reduced stepwise to almost 0 depending on the battery voltage while ensuring the voltage Vinv applied to the electric braking apparatus, thereby causing even a small current to flow through the motor 206 and securing the braking force if at all possible.

Figure 15:
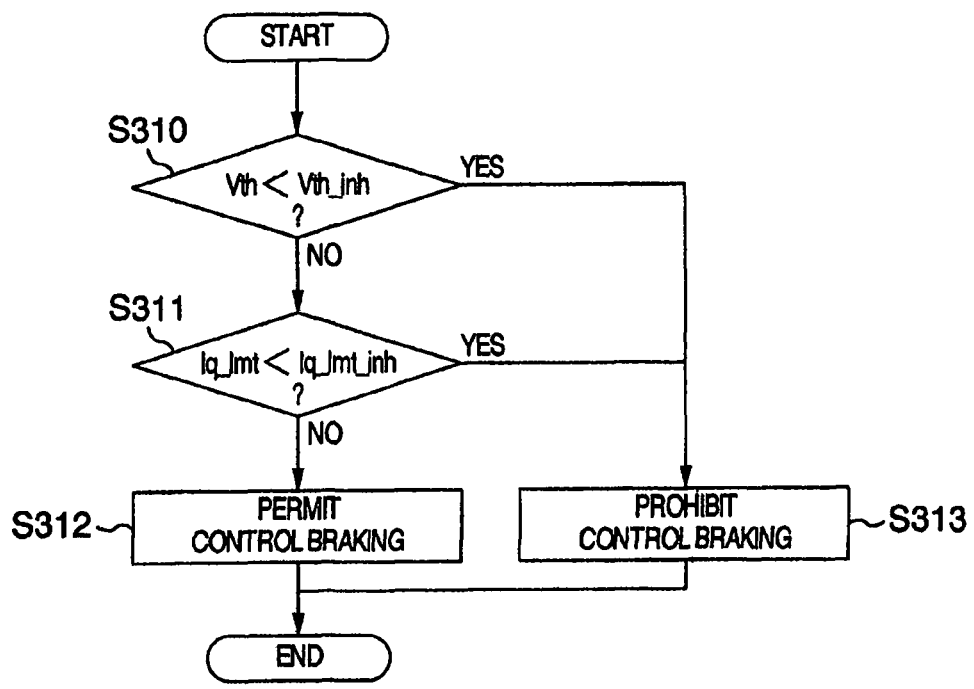
FIG. 15 is a flowchart of determining prohibition/permission of control braking.

FIG. 15 illustrates a flowchart of determination of prohibition/permission of control braking. The control braking implies a so-called vehicle behavior integrated control which includes preventing a vehicle skid, wheel locking when the wheels slip and/or wheel spin by activating the brakes irrespective of the driver's brake pedal stepping operation. The wheel behavior integrated control to be provided in this embodiment involves a brake assist function in which it is inferred from the driver's brake pedal stepping operation that an emergency has occurred, thereby increasing the braking force automatically; front, rear, right and left braking force distributing function in which appropriate braking forces are distributed to the front, rear, right and left wheels, thereby securing braking forces stabilized at all times; and a regeneration coordination brake function. That is, the control braking involves that the brakes are activated irrespective of the driver's brake pedal stepping operation, thereby rapidly increasing a current flowing through the electric braking apparatus.

In performing of the regeneration coordination brake function, when an operator makes foot braking, an optimum braking control is made by controlling a regeneration brake and another braking with the electric braking apparatus in cooperation with each other so as to make efficient energy recovery.

When the electric braking apparatus is shut down by the rapid increase in the current flowing therethrough owing to the control braking and hence no braking force acts, a yaw moment occurs on the vehicle, which may invite unexpected behavior. In order to avoid such situation, the flowchart of FIG. 15 determines whether the control braking should be prohibited or permitted.

In step 310 of FIG. 15, it is determined whether the inverter application voltage Vinv drops below a predetermined threshold Vinv_inh, which is determined by the minimum operation voltages of the respective components of the electric brake control unit 210.

When in step 310 the determination is YES, step S313 prohibits the control braking and terminates the processing. The prohibition of the control braking may be achieved by telling the brake integrated control module 100 so as not to send signals on the control braking to the electric braking apparatus or controlling the electric braking apparatus so as not to activate the control braking even when signals on the control braking are received from the brake integrated control module 100. The driver may be informed by sound message or by a display provided on an interface for the driver and the vehicle that the electric braking apparatus cannot perform the control braking.

When the determination is NO in step 310, step S311 determines whether the torque component current limit value Iq_lmt set by the torque component current limiter 603 is below a predetermined threshold Iq_lmt_inh, which may be determined by the kind of the control braking function of the vehicle. When the torque component current limit value Iq_lmt is set so as to be lower than the previous torque component current limit value Iq_lmt by the torque component current limitation map of FIG. 6, step S311 may determine YES.

When the determination in step 311 is YES, step S313 prohibits the control braking and terminates the processing.

When the determination in step 311 is NO, step S312 prohibits the control braking and then terminates the processing. Alternatively, any one of steps S310 and S311 may determine prohibition/permission.

Embodiment 2

Then, we will describe control of an electric braking control apparatus to be provided when the voltage applied by the power supply to the apparatus is low, as provided according to an embodiment 2 of the present invention.

Figure 9:
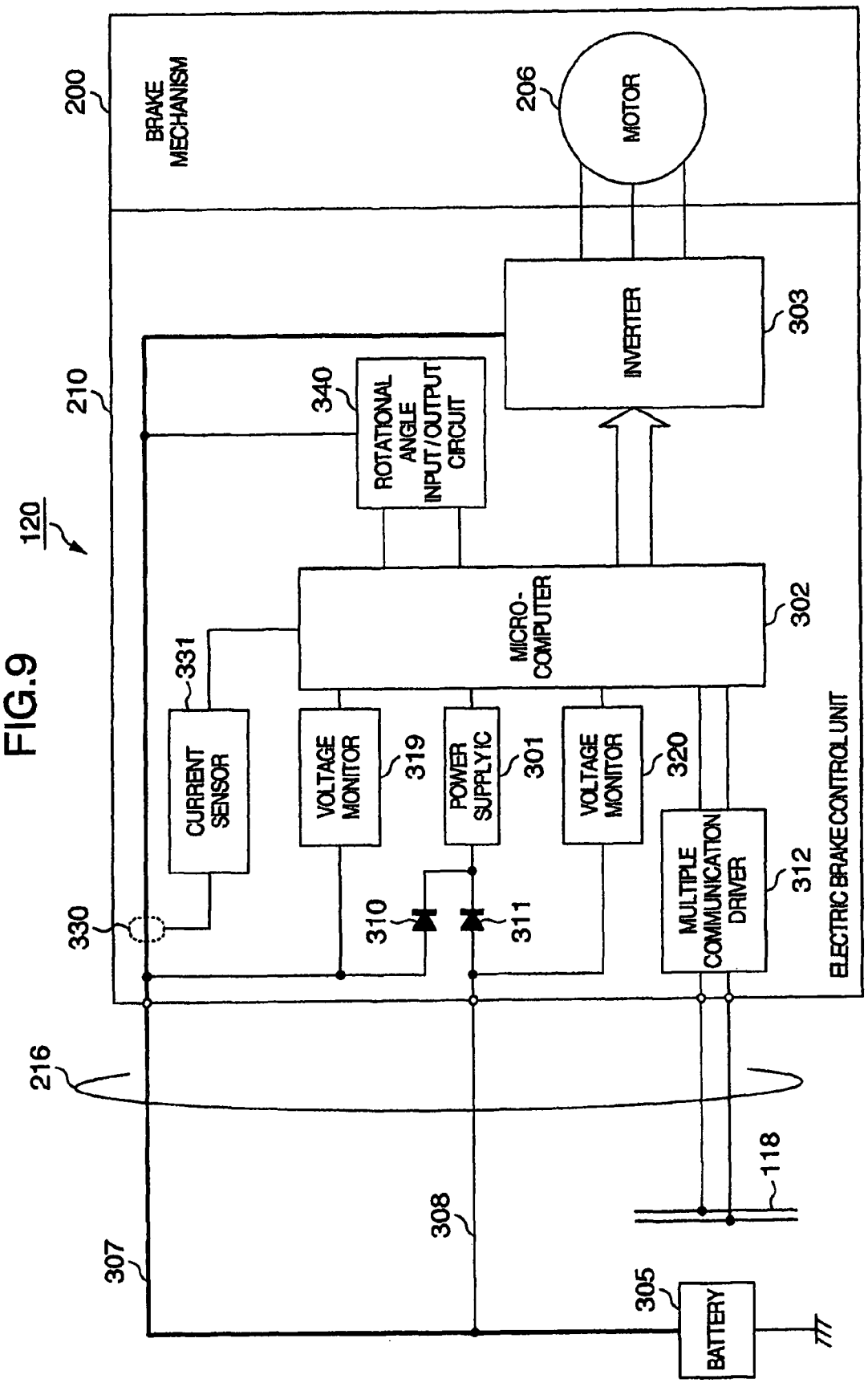
FIG. 9 illustrates still another embodiment of the power supply circuit composition of the electric brake control unit 210.

FIG. 9 illustrated another embodiment of the circuit composition of the electric brake control unit 210. A power supply IC 301 of FIG. 9 receives power from both higher and lower power supply lines 307 and 308 via two diodes 310 and 311, respectively. Thus, even when a voltage drop is caused across the higher power supply line 307 by a rush current, power is supplied from the lower power supply line 308 to the power supply IC 301. Thus, the power supply IC 301 operates in a stabilized manner.

The microcomputer 302 used is generally designed for 5 volt operation. Thus, the microcomputer 302 receives 5-volt power from the power supply IC 301 to which power an output from the 12V battery source 305 is stepped down. However, the inverter 303 and the rotational angle sensor input/output circuit 340 generally require a voltage of 5V or more. Thus, they receive power directly from the 12V battery source. Therefore, as shown in FIG. 9, the rotational angle sensor input/output circuit 340 is constituted so as to receive power from the higher power supply line 307. The rotational angle sensor input/output circuit 340 is an interface circuit for acquiring information about a motor rotational angle detected by the rotor position angle sensor 207 and outputting the rotational angle information to the microcomputer 302.

When a voltage drop occurs across the higher power supply line 307 by a rush current in the circuit of FIG. 9, it is required to secure a voltage which can continue to operate the rotational angle sensor input/output circuit 340.

The microcomputer 302 of FIG. 9 performs the same processing as described in the embodiment 1, excluding use of a map (not shown) corresponding to the torque component current limitation map 602 of FIG. 6 created using, as a reference, the lowest operation warranting voltage of the rotational angle sensor input/output circuit 340. Now, let Vmin be the lowest operation warranting voltage of the rotational angle sensor input/output circuit 340. Then, when the methods of FIGS. 5-7 are used, the voltage applied to the rotational angle sensor input/output circuit 340 is maintained above Vmin and hence stabilized braking force control is maintained irrespective of the battery voltage.

Embodiment 3

Then, we will describe control of an electric braking controller to be provided when the voltage applied by the power supply is low, as provided according to an embodiment 3 of the present invention.

Figure 10:
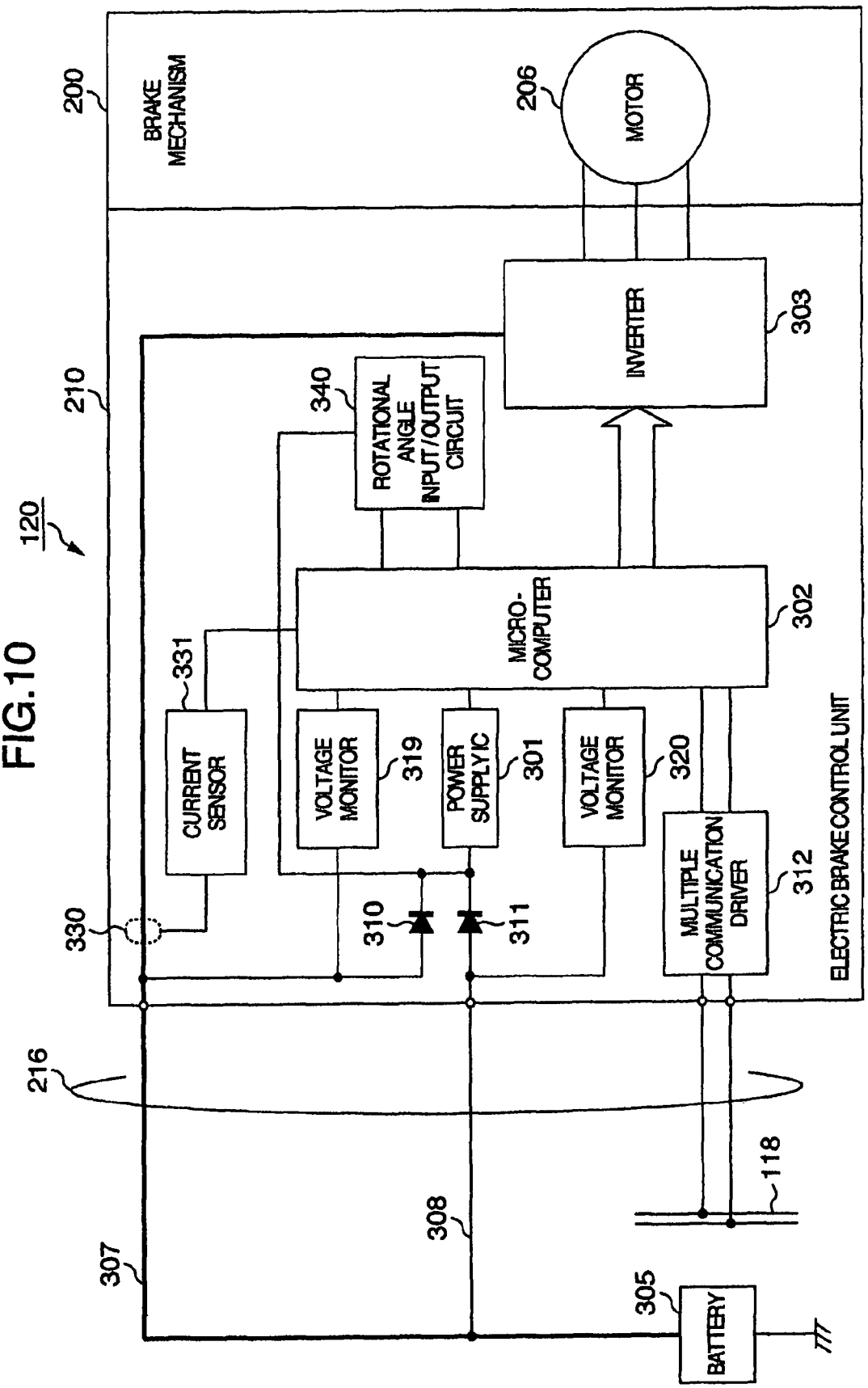
FIG. 10 illustrates a further embodiment of the power supply circuit composition of the electric brake control unit 210.

FIG. 10 shows the embodiment 3 of the circuit composition of the electric brake control unit 210.

In FIG. 10, the rotational angle sensor input/output circuit 340 receives power from higher and lower power supply lines 307 and 308 via diodes 310 and 311, respectively, as in the power supply IC 301 of FIG. 9. Thus, even when a voltage drop is caused across the higher power supply line 307 by a rush current, the rotational angle sensor input/output circuit 340 is supplied with power from the lower power supply line 308. Therefore, the rotational angle sensor input/output circuit 340 and the power supply IC 301 operate in a stabilized manner.

In FIG. 10, only an inverter 303 receives power directly from the higher power supply line 307 and there are no other components which will be influenced by the voltage drop across the higher power supply line 307. Thus, a current Idc flowing through the higher power supply line 307 is not required to be managed. However, when the lower power supply line 308 is, for example, broken down and the power cannot be supplied from this line to the power supply IC 301, power is supplied only from the higher power supply line 307 to the respective components concerned, as in FIGS. 4 and 9. Thus, a current Idc flowing through the higher power supply line 307 is required to be managed.

The microcomputer 302 of FIG. 10 performs the same processing as described in the embodiment 1, excluding use of a map (not shown) corresponding to the torque component current limitation map 602 of FIG. 6 created using, as a reference, the lowest operation warranting voltage of either of the power supply IC 301 and the rotational angle sensor input/output circuit 340. The difference of the embodiment 3 from the embodiments 1 and 2 will be described below.

Figure 11:
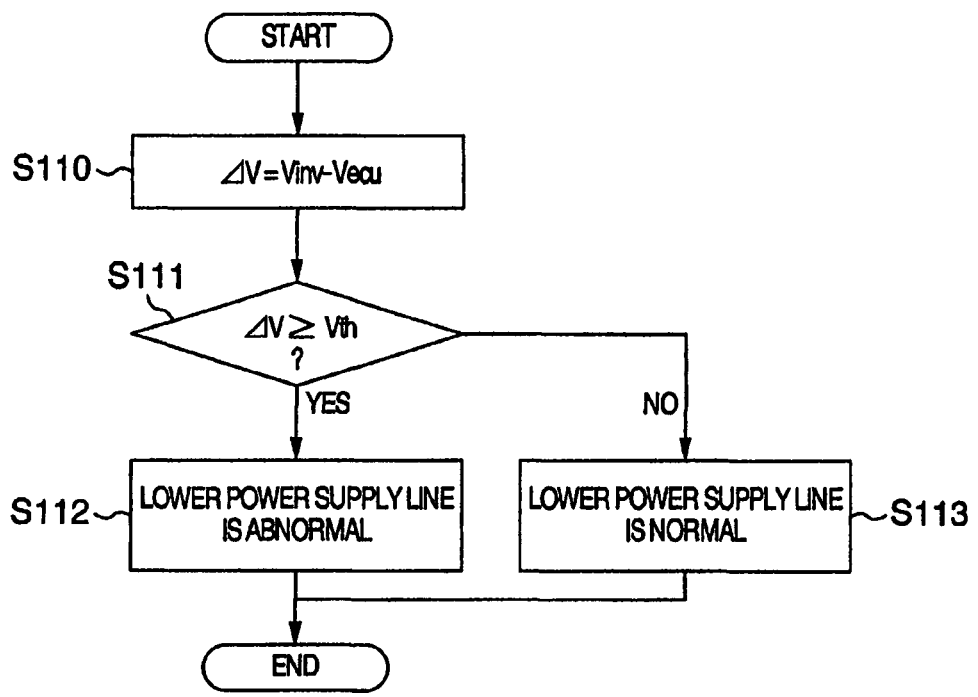
FIG. 11 is a flowchart of detecting a failure in a lower power supply line 308.

FIG. 11 is a flowchart of detection of an abnormality in the lower power supply line 308. In step S110, a power supply monitor 319 connected to the higher power supply line 307 detects an input voltage Vinv to the diode 310, and a power supply monitor 320 connected to the lower power supply line 308 detects an input voltage Vccu to the diode 311. Then, a deviation ΔV given by the following expression is calculated:

$$\Delta V = V\text{inv} - V\text{ccu} \qquad (5)$$

Step S111 determines whether ΔV calculated in step S110 is above a predetermined threshold Vth.

If the determination in step S111 is YES, step S112 determines that the lower power supply line 308 is abnormal. When the determination is NO in step S111, step S113 determines that the lower power supply line 308 is normal.

Figure 12:
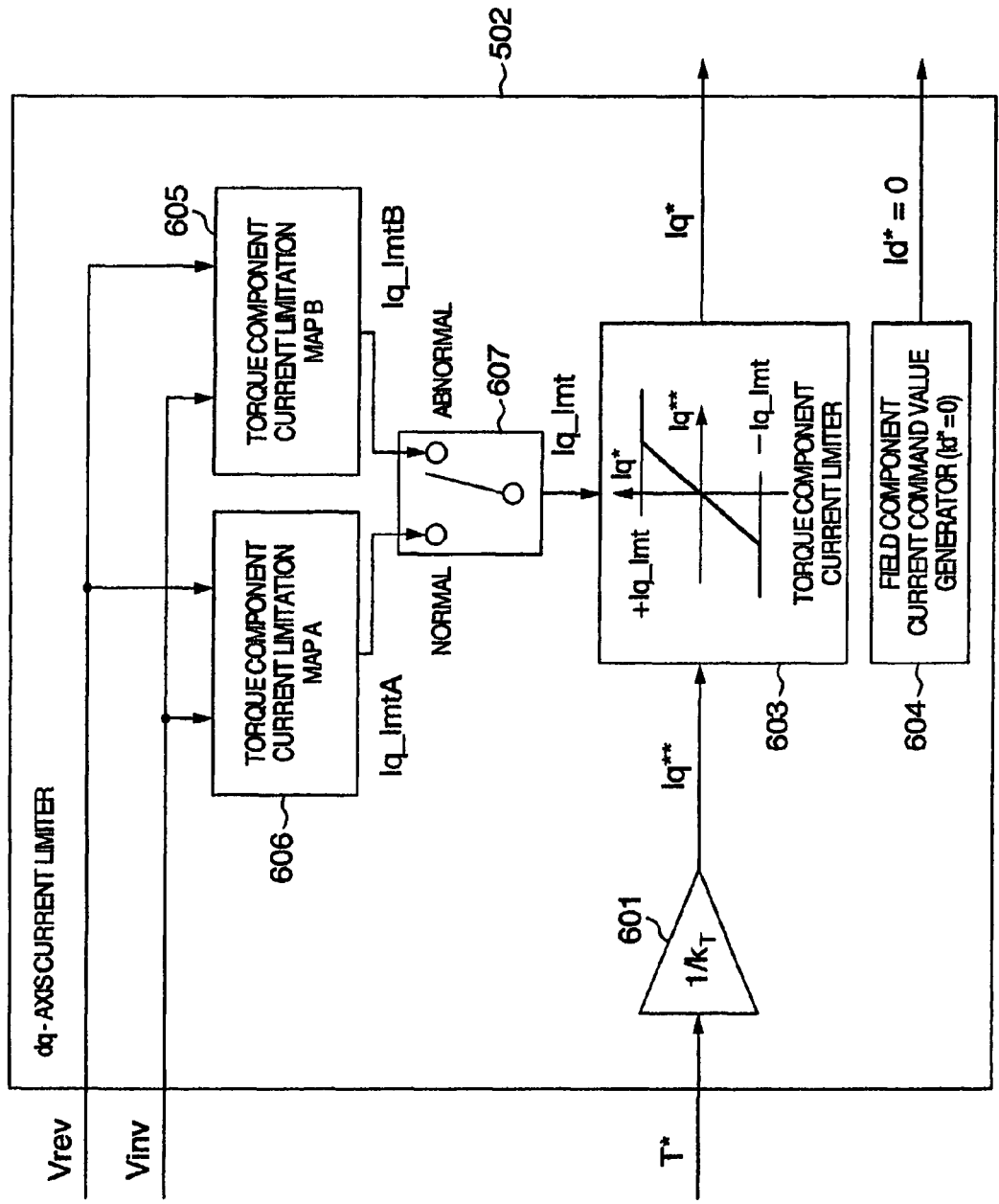
FIG. 12 illustrates another embodiment of the dq-axis current limiter 502.

FIG. 12 shows another embodiment of the dq-axis current limiter 502 using a result of determination by the flowchart of FIG. 11.

A torque component current limitation map B 605 has the same function as the torque component current limitation map 602 of FIG. 6 and limits the current Idc flowing through the higher power supply line 307.

Figure 13:
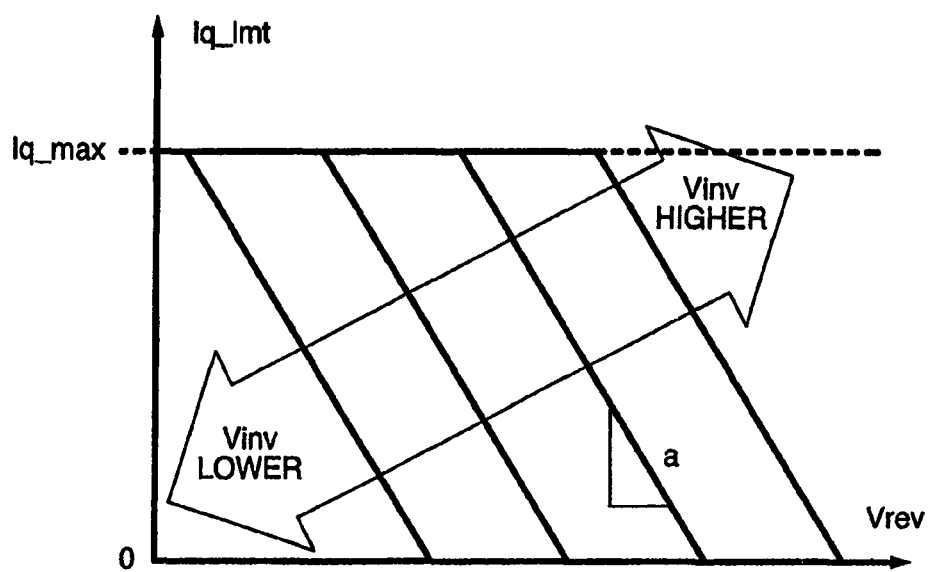
FIG. 13 illustrates another embodiment of the torque component current limitation map.

A torque component current limitation map A 606 does not limit a current Idc flowing through the higher power supply line 307 and its one embodiment is shown in FIG. 13. This embodiment uses the same torque component maximum current value Iq_max and gradient "a" as that shown in FIG. 7.

Two torque component current limit values Iq_lmtA and Iq_lmtB are derived from the torque component current limitation maps A 606 and B 605, respectively. A torque component current command value switching unit 607 selects Iq_lmtA or Iq_lmtB based on an abnormality condition determined in accordance with the abnormality detection flow of FIG. 11. More specifically, when the lower power supply line 308 is normal, Iq_lmtA is selected whereas when the line 308 is abnormal, Iq_lmtB is selected.

Further, in the torque component current limiting process unit 603, an unlimited torque component current command value Iq** is limited, thereby deriving a torque component current command value Iq*.

As described above, normally when the lower power supply line 308 is normal, the electric braking apparatus of the FIG. 10 embodiment provides the control without limiting the current Idc flowing through the higher power supply line 307. The components of the electric braking apparatus can receive power from the higher power supply line 307 even when the lower power supply line 308 is abnormal. Thus, a fault-tolerant electric braking apparatus is realized. Further, since the electric current Idc which flows through the higher power supply line 307 is limited and the voltage applied by the higher power supply line 307 to the components concerned is maintained above the lowest operation warranting voltage of the components. Thus, the electric braking apparatus can continue to operate in a stabilized manner irrespective of voltage drop at the battery.

Figure 3:
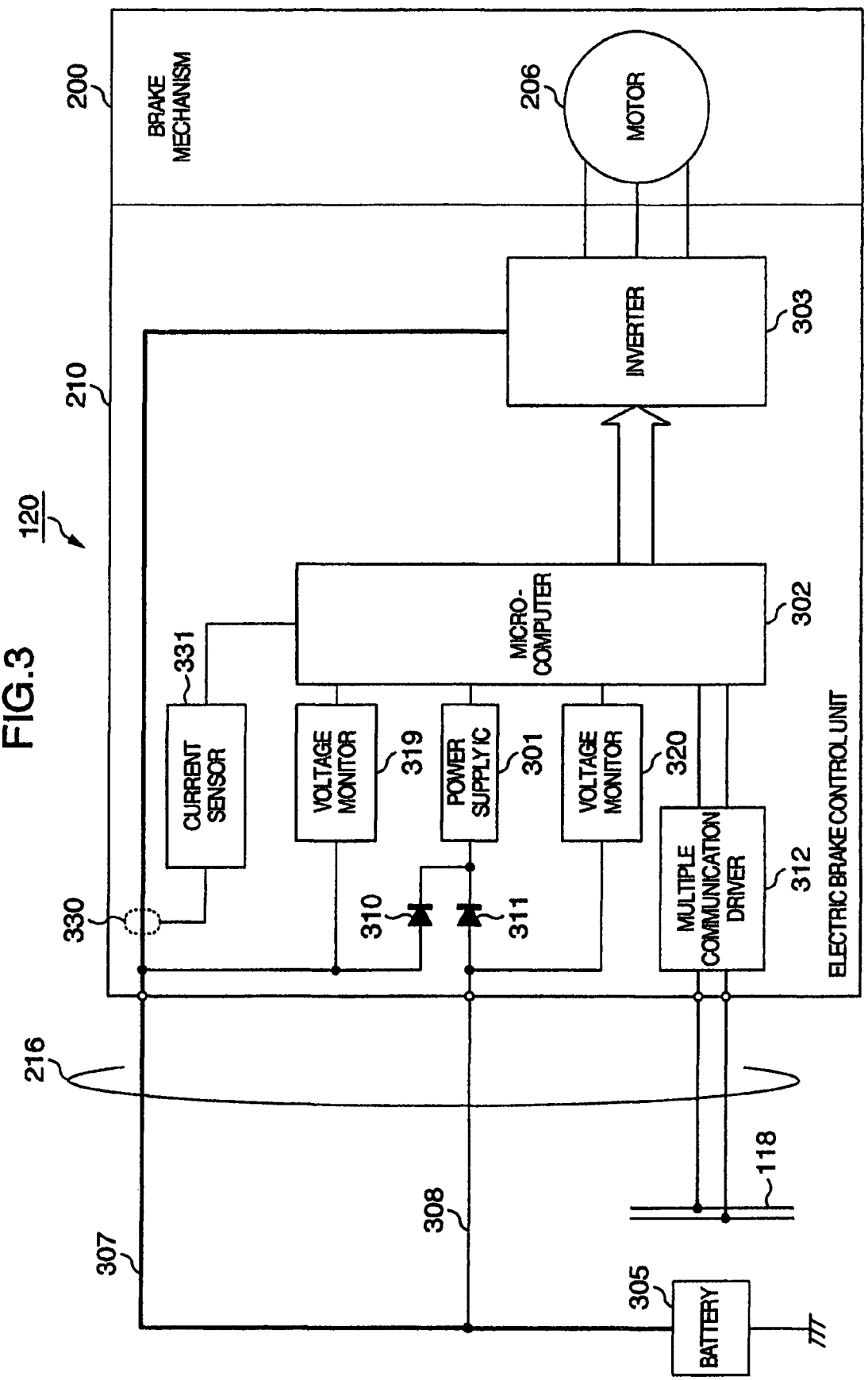
FIG. 3 illustrates one embodiment of a power supply circuit composition of an electric brake control unit 210.

FIG. 3 illustrates still another embodiment of the circuit composition of the electric brake control unit 210. A power supply IC 301 of FIG. 3 receives power from both higher and lower power supply lines 307 and 308 via two diodes 310 and 311, respectively. Thus, even when a voltage drop is caused across the higher power supply line 307 by a rush current, power is supplied from the lower power supply line 308 to the power supply IC 301. Thus, the power supply IC 301 operates in a stabilized manner. In FIGS. 3 and 9, all common or similar parts are denoted by the same reference numerals. Furthermore, in the interest of brevity, the details of the structure and operation of those common components shown in FIG. 3 will not be reiterated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric braking control apparatus for controlling an electric braking apparatus which includes a brake pad, a motor which generates a rotational torque, and a rotation/linear motion conversion mechanism which causes the brake pad to generate a pressing force based on the torque, the electric braking control apparatus comprising:
    an inverter configured to convert and output electric current supplied from a power supply to the motor;
    a microcomputer configured to receive power from the power supply, to detect the value of a voltage supplied from the power supply to the inverter, and to control the electric current output from the inverter in accordance with a result of the detection;
    a first power introducing terminal connected to an external power supply line to which power is supplied from the power supply;
    a first power supply path arranged to connect the first power introducing terminal with the inverter;
    a second power introducing terminal connected to the first power introducing terminal;
    a second power supply path arranged to connect the second power introducing terminal to the microcomputer and supply power from the first power introducing terminal to the microcomputer; and
    a third power supply path arranged to connect the second power introducing terminal to the microcomputer;
    wherein the microcomputer is configured to detect an inverter application voltage in the third power supply path and control a current to be supplied to the inverter so that a minimum operation voltage of an element between the second power introducing terminal and the microcomputer remains below the inverter application voltage in the third power supply path, which is applied by the inverter to the motor of the electric braking apparatus.

2. The electric braking control apparatus of claim 1, wherein the microcomputer is configured to acquire rotational information of the motor and to control the electric current output from the inverter at least partly based on the rotational information.

3. The electric braking control apparatus of claim 1, wherein the microcomputer is configured to determine whether an automatic braking control instructed by an external device irrespective of braking operation by an operator should be prohibited, and to notify the external device of a result of the determination.

4. The electric braking control apparatus of claim 1, further comprising a power supply controller configured to control a voltage from the power supply and to output the controlled voltage to the microcomputer, wherein the microcomputer is further configured to control the current output from the inverter such that a voltage applied to the power supply controller remains higher than a voltage required for operating the power supply controller.

5. The electric braking control apparatus of claim 1, further comprising a rotational angle information interface circuit that is configured to acquire information on the rotational angle of the motor, and to output this information to the microcomputer, and wherein the microcomputer is further configured to control the current quantity output from the inverter such that a voltage in the first power supply path remains higher than a voltage required for operating the rotational angle interface circuit.

6. The electric braking control apparatus of claim 1, wherein said microcomputer is configured to set a maximum current value supplied to the motor, and to control the inverter such that the current supplied to the motor does not exceed the maximum current value.

7. The electric braking control apparatus of claim 1, wherein the element between the second power introducing terminal and the microcomputer is a power supply integrated circuit.

* * * * *